United States Patent Office 3,701,786
Patented Oct. 31, 1972

3,701,786
DIBENZOFURANYL-AMINOALCOHOLS
Harvey B. Hopps, West Allis, Wis., Dennis Jackman, University, Miss., and John H. Biel, Lake Bluff, Ill., assignors to Aldrich Chemical Company, Inc., Milwaukee, Wis.
No Drawing. Continuation-in-part of application Ser. No. 693,765, Dec. 27, 1967, which is a continuation-in-part of application Ser. No. 605,995, Dec. 30, 1966, which in turn is a continuation-in-part of application Ser. No. 462,066, June 7, 1965, all abandoned. This application May 19, 1971, Ser. No. 145,060
Int. Cl. C07d 99/04
U.S. Cl. 260—293.58                                    6 Claims

ABSTRACT OF THE DISCLOSURE

Compounds of the formula

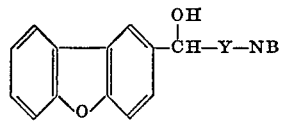

which possess hypotensive activity and are useful for treating hypertension in mammals and compounds of the formula

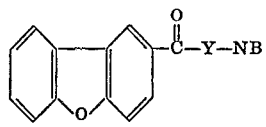

which are useful as intermediates in the preparation of the foregoing hypotensive agents and also in some cases exhibit hypotensive, sedative and muscle relaxant activity and processes for the preparation of the foregoing compounds. In the foregoing formulae, NB is a primary or secondary amino radical and Y is (lower)alkylene.

CROSS-REFERENCE TO RELATED APPLICATIONS

This is a continuation-in-part of application Ser. No. 693,765, filed Dec. 27, 1967, and now abandoned, which is a continuation-in-part of application Ser. No. 605,995, filed Dec. 30, 1966, and now abandoned, which is a continuation-in-part of application Ser. No. 462,066, filed June 7, 1965, and now abandoned.

It is an object of this invention to provide a new class of therapeutic compounds. It is another object of the present invention to provide novel compounds having hypotensive activity. It is a further object of the present invention to provide a process for preparing the novel therapeutic compounds and to provide intermediates useful in the preparation thereof. It is still a further object of the present invention to provide a novel method of treating hypertension.

These and other objects which may appear as the specification proceeds are achieved by this invention which comprises the provision of compounds selected from the group consisting of compounds having the following formula (I) 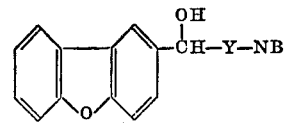

wherein NB is a primary or secondary amino radical and Y is (lower)alkylene; and the pharmaceutically acceptable nontoxic salts thereof.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric, cyclohexylsulfamic, naphthalenesulfonic, and the like.

The term "(lower)alkylene" as used herein means both straight and branched chain alkylene radicals containing from 1 to 8 carbon atoms, e.g. methylene, ethylene, octylene, propylene, butylene, isobutylene, t-butylene, amylene, hexylene, 2-ethylhexylene, etc.

The term "(lower)alkyl" as used herein means both straight and branched chain aliphatic hydrocarbon radicals containing from 1 to 8 carbon atoms, e.g. methyl, ethyl, propyl, isopropyl, butyl, isobutyl, t-butyl, amyl, hexyl, 2-ethylhexyl, octyl, etc.

Similarly, where the term "(lower)" is used as part of the description of another group, e.g., (lower)alkoxy, it refers to the alkyl portion of such group which is therefore as described in connection with "(lower)alkyl."

The term "primary amino radical" as used herein refers to a radical obtained by removing one hydrogen atom attached to the nitrogen atom of a primary amine, and thus comprises radicals of the formula:

(II)                    —NHR¹ wherein R¹ is selected from the group consisting of (lower)alkyl, cycloalkyl having from 3 to 7 carbon atoms, inclusive, β-phenylcyclopropyl, benzodioxan-2-methylene, and radicals of the formula (III) 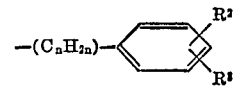

wherein n is a whole integer from 0 to 3 inclusive; and R² and R³ each represent a member selected from the group consisting of hydrogen, (lower)alkyl, (lower)alkoxy, chloro, bromo, fluoro, iodo, trifluoromethyl, di(lower)alkylamino, (lower)alkylthio, phenyl, phenoxy and benzyl. The term "primary amino radical" therefore includes for example, such radicals as methylamino, ethylamino, propylamino, isopropylamino, hexylamino, cyclopropylamino, cyclopentylamino, cyclohexylamino, cycloheptylamino, phenylamino, benzylamino, p-methoxyphenylamino, o-chlorobenzylamino, benzodioxan-2-methyleneamino, β-phenethylamino, 2,4-dimethylphenylamino and the like.

The term "secondary amino radical" refers to a radical obtained by removing one hydrogen atom attached to the nitrogen atom of a secondary amine, and thus comprises radicals of the formula (IV) 

wherein R⁴ and R⁵ are selected from the group consisting of (lower)alkyl, cycloalkyl having from 3 to 7 carbon atoms inclusive, β-phenylcyclopropyl, benzodioxan-2-methylene, and radicals of the formula (V) 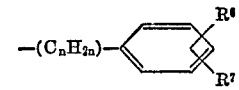

wherein n is a whole integer from 0 to 3 inclusive; and R⁶ and R⁷ each represent hydrogen, (lower)alkyl, (lower)alkoxy, chloro, bromo, fluoro, iodo, trifluoromethyl, di (lower)alkylamino, (lower)alkylthio, phenyl, phenoxy and benzyl, and when $R^6$ and $R^7$ are taken together with

they constitute a heterocyclic ring of the formulae (VI) 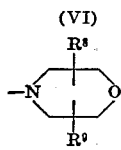 (VII)

(VIII) (IX) 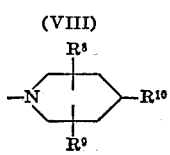

(X) (XI)

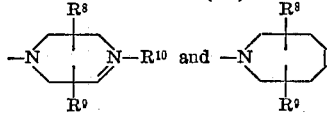

wherein $R^8$ and $R^9$ each represent hydrogen, (lower)alkyl or hydroxy, $R^{10}$ represents hydrogen, (lower)alkyl, hydroxy or a radical of the formula (XII) 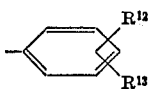

wherein $R^{12}$ and $R^{13}$ each represent a member selected from the group consisting of hydrogen, (lower)alkyl, (lower)alkoxy, chloro, bromo, fluoro, iodo, trifluoromethyl, di(lower)alkylamino, (lower)alkylthio, phenyl, phenoxy and benzyl; $R^{11}$ represents (lower)alkyl, hydroxy or a radical of the formula (XIII) 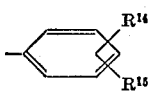

wherein $R^{14}$ and $R^{15}$ each represent a member selected from the group consisting of hydrogen, (lower)alkyl, (lower)alkoxy, chloro, bromo, fluoro, iodo, trifluoromethyl, di(lower)alkylamino, (lower)alkylthio, phenyl, phenoxy and benzyl. The term "secondary amino radical" therefore includes for example, such radicals as pyrrolidino, 3-hydroxypyrrolidino, piperidino, 4-hydroxypiperidino, 4 - phenyl - 1,2,5,6 - tetrahydropyridino, 4-phenylpiperazino, 4 - (o - methoxy)phenylpiperazino, 4-methylpiperazino, morpholino, 2 - methylmorpholino, hexamethyleneimino, 2,4 - dimethylhexamethyleneimino, 4-phenylpiperidino, 1,2,5,6-tetrahydropyridino, dimethylamino, diethylamino, dipropylamino, di-n-butylamino, diisoamylamino, dibenzylamino, diphenylamino, dicyclopropylamino, dicyclopentylamino, dicyclohexylamino, dicycloheptylamino, N-benzyl - N - cyclopropylamino, N-methyl - N - (p - trifluoromethylphenyl)amino, N-methyl-N - (2,4 - dimethylphenyl)amino, N - benzodioxan - 2-methylene-N-methylamino and the like.

The compounds of this invention having the structure described in Formula I and some of the compounds of Formula XVIII, i.e. those of the formula (XIV)

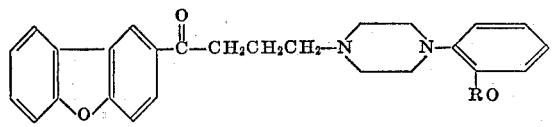

wherein R is (lower)alkyl described hereinafter, produce a potent and prolonged blood pressure lowering effect in mammals which makes them useful in the treatment of hypertension.

Tests of the compounds of the present invention for hypotensive activity were carried out in rats and dogs. When, for example, N - [γ - hydroxy - γ - (2 - dibenzofuryl)butyl] - 4 - phenyl - 1,2,5,6 - tetrahydropyridine hydrochloride was administered orally in rats at dosages of 10 mg./kg., a reduction in arterial blood pressure was obtained of greater than 10%. When 2 - [4 - (o - methoxyphenylpiperazino) - butyroyl]dibenzofuran was administered orally in dogs at dosages of 20 mg./kg., a reduction in arterial blood pressure was obtained of greater than 10%.

Some of the compounds of Formula XVIII, i.e. those of the formula (XV)

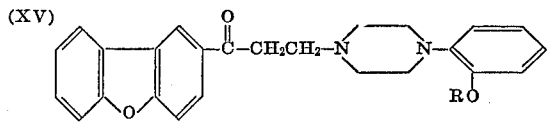

wherein R is (lower)alkyl described hereinafter possess sedative activity and muscle relaxant activity making them useful as minor tranquilizers in mammals.

The muscle relaxant activity of the compounds was determined by pressing the abdomen and flexing the hind limbs of the treated mouse. Limb tone and grip strength were further checked by placing the mice on a vertical pole. A mouse treated with a muscle relaxant drug shows little if any resistance to flexing or abdominal tone, and is unable to climb the pole or to maintain itself on the pole. Doses as low as 75 mg./kg. p.o. of a preferred compound 2-[β-(N - o - methoxyphenyl)piperazino]propionyl dibenzofuran in mice produced muscle relaxant activity.

The sedative activity of the compounds was evaluated by the behavioral depression test. In the behavioral depression test, treated mice are observed in an undisturbed condition for signs of behavioral depression and are checked for their reaction to selected auditory, nociceptive and tactile stimuli. At the same time, a subjective evaluation of spontaneous motor activity is made. When, for example, a preferred compound 2-[β-(N-o-methoxyphenyl)piperazino]propionyl dibenzofuran was tested, it exhibited sedative activity at doses as low as 75 mg./kg. p.o. The $LD_{50}$ for the compound is greater than 3000 mg./kg.

A preferred group of compounds of Formula I are those of the formula (XVI) 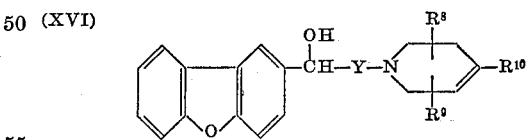

wherein $R^8$, $R^9$, $R^{10}$ and Y are as described above. A more preferred group of compounds are those of the formula (XVII) 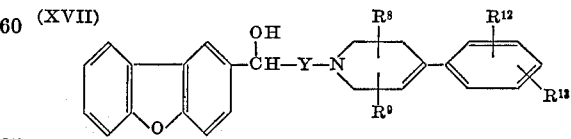

wherein $R^8$, $R^9$, $R^{12}$, $R^{13}$ and Y are as described above.

Representative of the compounds of this invention are 1-(2-dibenzofuryl)-2-isopropylaminoethanol,
1-(2-dibenzofuryl)-2-(β-phenethylamino)ethanol,
1-(2-dibenzofuryl)-4-(4-trifluoromethylphenylamino) butanol,
1-(2-dibenzofuryl)-2-(β-phenylisopropylamino)ethanol,
1-(2-dibenzofuryl)-2-(2-benzodioxanmethyleneamino) propanol, 1-(2-dibenzofuryl)-2-cyclopropylaminopropanol,
1-(2-dibenzofuryl)-4-diethylaminobutanol,
1-(2-dibenzofuryl)-2-(4-phenyl-1,2,5,6-tetrahydro-
    pyridino)ethanol,
1-(2-dibenzofuryl)-3-(4-phenyl-1,2,5,6-tetrahydro-
    pyridino)propanol,
1-(2-dibenzofuryl)-4-(4-phenyl-1,2,5,6-tetrahydro-
    pyridino)butanol,
1-(2-dibenzofuryl)-2-(4-phenylpiperazino)ethanol,
1-(2-dibenzofuryl)-2-(4-o-methoxyphenylpiperazino)
    ethanol,
1-(2-dibenzofuryl)-3-(4-o-methoxyphenylpiperazino)
    propanol,
1-(2-dibenzofuryl)-4-(4-o-methoxyphenylpiperazino)
    butanol,
1-(2-dibenzofuryl)-4-morpholinobutanol,
1-(2-dibenzofuryl)-4-(1,2,5,6-tetrahydropyridino)
    butanol,
1-(2-dibenzofuryl)-4-piperidinobutanol,
1-(2-dibenzofuryl)-4-pyrrolidinobutanol,
1-(2-dibenzofuryl)-4-hexamethyleneiminobutanol,
1-(2-dibenzofuryl)-4-(3-hydroxypyrrolidino)butanol,
1-(2-dibenzofuryl)-2-(4-2,4-dimethylphenylpiperidino)
    ethanol and
1-(2-dibenzofuryl)-4-(2,4,6-trimethylpiperazino)butanol.

The compounds of the present invention are prepared according to the following general procedure which consists of reducing an aminoketone of the formula (XVIII)

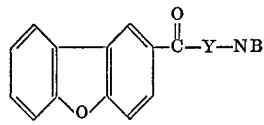

wherein Y and NB are as represented above, to an aminoalcohol of Formula I. The reduction may be effected chemically or by catalytic means. Some of the chemical reducing agents which may be used are sodium borohydride in a hydroxylic solvent such as methanol or ethanol or lithium aluminum hydride in anhydrous ethyl ether or tetrahydrofuran. Catalysts such as platinum, platinum oxide, platinum-on-a-carrier and hydrogen at elevated pressures (30–3,000 p.s.i.) are capable of reducing the aminoketone of Formula XVIII to the aminoalcohol of Formula I. In the case of an unsaturated aminoketone (e.g., where NB is 4-phenyl-1,2,5,6-tetrahydropyridino or 1,2,5,6-tetrahydropyridino), the preferred method of reduction is the sodium borohydride procedure.

The novel aminoketones of Formula XVIII, which are intermediates for the preparation of the aminoalcohols of this invention (Formula I), are considered a part of the present invention and are prepared by the following series of reactions.

(A) Dibenzofuran is reacted with a compound of the formula (XIX)

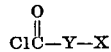

wherein X is a reactive halogen such as chloro, bromo or iodo, and Y is as described above, in the presence of a Lewis acid, such as aluminum chloride and in the presence of a nonreactive solvent such as benzene to produce a haloketone of the formula

XX)

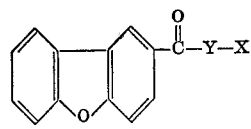

wherein X and Y are as described above. The foregoing described reaction is the Friedel-Crafts reaction, and may be represented as follows:

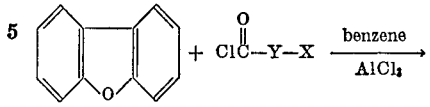

wherein X and Y are as described above.

Representative of the haloketones formed in this manner are 2-(2-chloroacetyl)dibenzofuran,
2-(3-chloropropionyl)dibenzofuran,
2-(4-chlorobutyroyl)dibenzofuran,
2-(3-bromobutyroyl)dibenzofuran, and
2-(2-chloropropionyl)dibenzofuran.

(B) Amination of the haloketone prepared in Reaction A with a primary or secondary amine of the formula (XXI)        HNB wherein NB is as described above, in a nonreactive solvent such as dimethylformamide, methylisobutylketone, dimethylsulfoxide and toluene in the presence of an acid acceptor such as potassium carbonate, aminopyrine, N-ethyl-N-butylaniline and pyridine and preferably a catalyst such as potassium iodide produces the desired aminoketone of Formula XVIII. This reaction may be represented as follows:

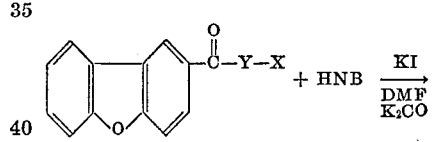

wherein X, Y and NB are as described above.

Some of the amines which may be used in this reaction are
isopropylamine,
β-phenethylamine,
β-phenylisopropylamine,
2-methylaminomethylbenzodioxane,
2-aminomethylbenzodioxane,
cyclopropylamine,
β-phenylcyclopropylamine,
pyrrolidine,
3-hydroxypyrrolidine,
piperidine,
4-hydroxypiperidine,
4-phenyl-1,2,5,6-tetrahydropyridine,
4-phenyl-4-hydroxypiperidine,
4-(o-methoxyphenyl)piperazine and
4-phenylpiperazine.

Representative of the aminoketones formed in this manner are 2-(3-isopropylaminopropionyl)dibenzofuran,
2-(3-β-phenethylaminopropionyl)dibenzofuran,
2-(4-piperidinobutyroyl)dibenzofuran,
2-[4-(4-phenyl-1,2,5,6-tetrahydropyridino)butyroyl]
    dibenzofuran,
2-[3-(4-phenylpiperazino)propionyl]dibenzofuran,
2-[4-(4-o-methoxyphenylpiperazino)butyroyl]
    dibenzofuran, 2-[4-(2-benzodioxanmethyleneamino)butyroyl]
dibenzofuran,
2-[4-(N-2-benzenedioxanmethylene-N-methylamino)
butyroyl]dibenzofuran,
2-(3-cyclopropylaminopropionyl)dibenzofuran,
2-(2-isopropylaminoacetyl)dibenzofuran,
2-(2-β-phenylcyclopropylaminoacetyl)dibenzofuran,
2-(2-β-phenylisopropylaminoacetyl)dibenzofuran and
2-[2-(β-3,4-methylenedioxyphenylisopropylamino)
acetyl]dibenzofuran.

The novel aminoketones of Formula XVIII wherein Y is —$CH_2CH_2$— which are intermediates for the preparation of the corresponding aminoalcohols of this invention (Formula I) are also prepared by the following series of reactions.

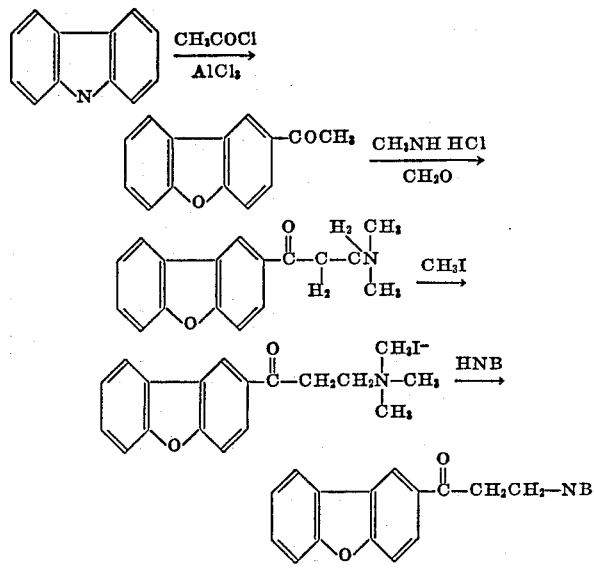

NB is as described above.

In essence, it involves a Friedel-Crafts reaction of dibenzofuran with acetyl chloride to produce the 2-acetyldibenzofuran. The latter is then subjected to a Mannich reaction with dimethylamine and the Mannich base quaternized with methyl iodide. The quaternary ammonium salt is allowed to react with the corresponding amine (HNB) to yield the desired aminoketone.

The reaction is particularly useful for producing the novel aminoketones of Formula XV i.e. where HNB is

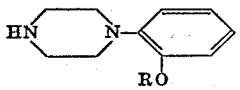

wherein R is (lower)alkyl which possess sedative and muscle relaxant activity and are useful as minor tranquilizers.

The starting materials used in the processes described herein are compounds which are either commercially available, well known in the art, or easily prepared in accordance with standard organic procedures previously described in the chemical literature.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The compositions of this invention when administered orally or parenterally, in an effective amount are effective in the treatment of hypertension and in producing sedation and muscle relaxation in mammals. The novel compounds of this invention may be advantageously administered at a dosage range from about 5 mg./kg. to about 1000 mg./kg. per day, preferably in subdivided amounts on a 2 to 4 times a day regimen. Typically treatment in man is begun at about ½ the animal minimum effective dose and then increased or decreased as required.

The following examples are intended to illustrate the invention described herein without unduly restricting it.

EXAMPLE 1

Preparation of 2-(4-chlorobutyroyl)dibenzofuran

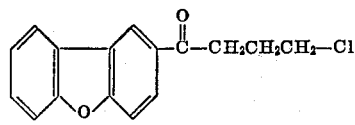

A mixture of dibenzofuran (70 gm., 0.43 mol) and 500 ml. of dry benzene was treated with anhydrous aluminum chloride (61 gm., 0.46 mol) and then 4-chlorobutyroyl chloride (65 gm., 0.46 mol). After 5 minutes, a vigorous reaction began which required cooling. The mixture was allowed to stand at room temperature for 5 hours and then poured onto crushed ice. After 0.5 hour, 150 ml. of concentrated hydrochloric acid was added. The mixture was stirred for 1 hour, and then the organic layer was removed, washed with potassium carbonate solution and water, and dried over calcium chloride. The solvent was removed under vacuum to yield 101 gm. of an oil which solidified on cooling. This material was recrystallized from 300 ml. of methanol to give 62 gm. of the product, 2-(4-chlorobutyroyl)dibenzofuran, M.P. 83–90° C.

EXAMPLE 2

Preparation of 2-[γ-(4-phenyl-1,2,5,6-tetrahydropyridino) butyroyl]dibenzofuran

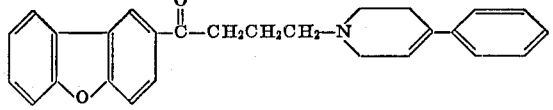

A mixture of 4-phenyl-1,2,5,6-tetrahydropyridine (16 gm., 0.1 mol), potassium carbonate (13.8 gm., 0.1 mol), potassium iodide (2 gm., 0.015 mol), 2-(4-chlorobutyroyl) dibenzofuran (28 gm., 0.1 mol), and 60 ml. of dimethylformamide was heated at reflux overnight, and then poured into 300 ml. of water. A red oil separated which solidified. This material was filtered and recrystallized from ethanol to give 25 gm. of the product, 2-[γ-(4-phenyl-1,2,5,6-tetrahydropyridino)butyroyl]dibenzofuran, M.P. 107–108° C. 2 - [γ - (4 - phenyl - 1,2,5,6-tetrahydropyridino)butyroyl] dibenzofuran 2-naphthalene sulfonate was made in hot isopropanol, M.P. 223–224° C.

EXAMPLE 3

Preparation of N-[γ-hydroxy-γ-(2-dibenzofuryl)butyl]-4-phenyl-1,2,5,6-tetrahydropyridine hydrochloride

[Also known herein as 1-(2-dibenzofuryl)-4-(4-phenyl-1,2,5,6-tetrahydropyridino)butanol]

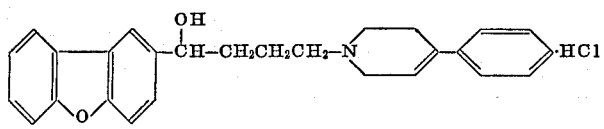

A mixture of 2-[γ-(4-phenyl-1,2,5,6-tetrahydropyridino)butyroyl]dibenzofuran (5 gm., 0.012 mol) and sodium borohydride (1 gm., 0.025 mol) in dry ethanol was refluxed for 5 hours, then allowed to stand for 48 hours.

The solvent was removed, and 40 ml. of water was added. The product was filtered, washed with water, and recrystallized from ethanol to give 4 gm. of N-[γ-hydroxy-γ-(2 - dibenzofuryl)butyl]-4-phenyl-1,2,5,6-tetrahydropyridine, M.P. 120–122° C. A solution of 2.8 gm. of the compound in 10 ml. of ethanol was then treated with 5 ml. of 2.08 N ethanolic hydrochloric acid rapidly. The solution cleared, and after 2 minutes the N-[γ-hydroxy-γ-(2-dibenzofuryl)butyl]-4-phenyl-1,2,5,6-tetrahydropyridine hydrochloride crystallized, M.P. 181–182° C.

EXAMPLE 4

Preparation of 2-(4-piperidinobutyroyl)dibenzofuran hydrochloride

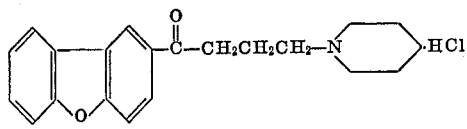

A mixture of piperidine (4.5 gm., 0.05 mol), potassium carbonate (7 gm., 0.05 mol), potassium iodide (9 gm., 0.05 mol), 2-(4-chlorobutyroyl)dibenzofuran (13.6 gm., 0.05 mol), and 150 ml. of dimethylformamide was refluxed (temperature=142° C.) for 24 hours, then poured into 500 ml. of water. After 2 hours, the aqueous solution was extracted with ether, the ether layer was washed with water, dried, and evaporated to yield 14 gm. of a dark oil. This was purified by forming the 2-naphthalene sulfonate in hot ethanol. This gave 11 gm. of 2-(4-piperidinobutyroyl)dibenzofuran 2-naphthalene sulfonate salt, M.P. 195–196.5° C., which was converted to 5.5 gm. of the pure free base. 2-(4-piperidinobutyroyl)dibenzofuran hydrochloride was made, and recrystallized from ethanol to give the pure product, M.P. 235–236° C.

*Analysis.*—Calcd. for $C_{21}H_{24}ClNO_2$ (percent): C, 70.48; H, 6.76; N, 3.91; Cl, 9.91. Found (percent): C, 69.57; H, 6.68; N, 3.99; Cl, 10.16.

EXAMPLE 5

Preparation of 1-(2-dibenzofuryl)-4-piperidinobutanol

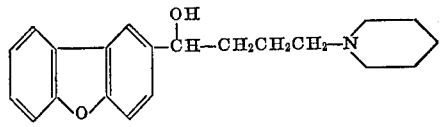

A mixture of 3.6 gm. of 2-(4-piperidinobutyroyl)dibenzofuran hydrochloride in methanol solution was reduced with 2 gm. of sodium borohydride. The reaction mixture was allowed to stand overnight. The solution was evaporated, and the residue shaken with water plus ether. The ether layer was dried over potassium carbonate and evaporated to give 3.3 gm. of the base 1-(2-dibenzofuryl)-4-piperidinobutanol in the form of a light yellow oil. IR showed no

but —OH. The base was converted to the hydrochloride salt by treating the ethanol solution (10 ml. at OH) of the base with 13 ml. of 0.77 N ethanolic hydrochloric acid (.01 mol) and adding heptane, and scratching. The product 1-(2-dibenzofuryl)-4-piperidinobutanol hydrochloride crystallized, weight 2.6 gm. M.P. 189–190° C.; after recrystallization from ethanol, M.P. 190–190.5° C.

EXAMPLE 6

When, in the procedure of Example 2, 4-phenyl-1,2,5,6-tetrahydropyridine is replaced by an equal molar amount of 1,2,5,6-tetrahydropyridine,
2-hydroxy-1,2,5,6-tetrahydropyridine,
4-methyl-1,2,5,6-tetrahydropyridine,
5-methyl-1,2,5,6-tetrahydropyridine,
2,5-dimethyl-1,2,5,6-tetrahydropyridine,
5-octyl-1,2,5,6-tetrahydropyridine,
6-propyl-1,2,5,6-tetrahydropyridine,
2-hydroxy-5-methyl-1,2,5,6-tetrahydropyridine,
3-methyl-1,2,5,6-tetrahydropyridine,
4-4-methoxyphenyl-1,2,5,6-tetrahydropyridine,
4-3-chlorophenyl-1,2,5,6-tetrahydropyridine,
4-2-iodophenyl-1,2,5,6-tetrahydropyridine,
4-4-methylphenyl-1,2,5,6-tetrahydropyridine,
4-2,4-dimethoxyphenyl-1,2,5,6-tetrahydropyridine,
4-4-dimethylaminophenyl-1,2,5,6-tetrahydropyridine,
4-4-phenylphenyl-1,2,5,6-tetrahydropyridine,
4-4-methylthiophenyl-1,2,5,6-tetrahydropyridine,
4-2-fluorophenyl-1,2,5,6-tetrahydropyridine,
4-3-benzylphenyl-1,2,5,6-tetrahydropyridine,
4-4-trifluoromethylphenyl-1,2,5,6-tetrahydropyridine,
2-methyl-4-phenyl-1,2,5,6-tetrahydropyridine,
4-4-bromophenyl-1,2,5,6-tetrahydropyridine,
4-4-phenoxyphenyl-1,2,5,6-tetrahydropyridine,
2,6-dimethyl-4-phenyl-1,2,5,6-tetrahydropyridine,
4-hydroxy-1,2,5,6-tetrahydropyridine,
morpholine,
2-hydroxymorpholine,
2,5-dimethylmorpholine,
3-methylmorpholine,
2-hexylmorpholine,
4-methylpiperidine,
2,6-diethylpiperidine,
4-hydroxypiperidine,
4-phenylpiperidine,
4-4-chlorophenylpiperidine,
3-butylpiperidine,
4-2-bromophenylpiperidine,
4-phenyl-4-hydroxypiperidine,
4-3-iodophenylpiperidine,
4-4-trifluoromethylphenylpiperidine,
4-2,5-dimethylphenylpiperidine,
4-3-ethoxyphenylpiperidine,
4-3-dimethylaminophenylpiperidine,
4-4-fluorophenylpiperidine,
4-4-phenylpiperidine,
4-4-phenoxyphenylpiperidine,
4-4-benzylphenylpiperidine,
4-4-methylthiophenylpiperidine,
4-2-methoxyphenylpiperidine,
4-2-propoxyphenylpiperidine,
2,5-dimethyl-4-phenylpiperidine,
3-hydroxy-4-4-trifluoromethylphenylpiperidine,
hexamethyleneimine,
3-methylhexamethyleneimine,
4-hydroxyhexamethyleneimine,
3,6-diethylhexamethyleneimine,
2-hydroxyhexamethyleneimine,
pyrrolidine,
2-methylpyrrolidine,
2-hexylpyrrolidine,
3-hydroxypyrrolidine,
2-hydroxy-3-methylpyrrolidine,
2,4-dimethylpyrrolidine,
4-methylpiperazine,
4-hydroxypiperazine,
4-phenylpiperazine,
4-2-methoxyphenylpiperazine,
2-hydroxypiperazine,
2,6-dimethylpiperazine,
4-4-trifluoromethylphenylpiperazine,
4-2-chlorophenylpiperazine,
4-3-bromophenylpiperazine,
4-2-fluorophenylpiperazine,
4-2-iodophenylpiperazine,
4-4-methylphenylpiperazine,
4-3-methylthiophenylpiperazine, 4-3-phenylphenylpiperazine,
4-3-phenoxyphenylpiperazine,
4-2-benzylphenylpiperazine,
4-4-diethylaminophenylpiperazine,
4-4-methoxyphenylpiperazine and
4-3-propoxyphenylpiperazine, there are obtained, 2-[γ-(1,2,5,6-tetrahydropyridino)butyroyl]dibenzofuran,
2-[γ-(2-hydroxy-1,2,5,6-tetrahydropyridino)butyrol]dibenzofuran,
2-[γ-(4-methyl-1,2,5,6-tetrahydropyridino)butyroyl]dibenzofuran,
2-[γ-(5-methyl-1,2,5,6-tetrahydropyridino)butyroyl]dibenzofuran,
2-[γ-(2,5-dimethyl-1,2,5,6-tetrahydropyridino)butyroyl]dibenzofuran,
2-[γ-(5-octyl-1,2,5,6-tetrahydropyridino)butyroyl]dibenzofuran,
2-[γ-(6-propyl-1,2,5,6-tetrahydropyridino)butyroyl]dibenzofuran,
2-[γ-(2-hydroxy-5-methyl-1,2,5,6-tetrahydropyridino)butyroyl]dibenzofuran,
2-[γ-(3-methyl-1,2,5,6-tetrahydropyridino)butyroyl]dibenzofuran,
2-[γ-(4-4-methoxyphenyl-1,2,5,6-tetrahydropyridino)butyroyl]dibenzofuran,
2-[γ-(4-3-chlorophenyl-1,2,5,6-tetrahydropyridino)butyroyl]dibenzofuran,
2-[γ-(4-2-iodopheny-1,2,5,6-tetrahydropyridino)butyroyl]dibenzofuran,
2-[γ-(4,4-dimethylphenyl-1,2,5,6-tetrahydropyridino)butyroyl]dibenzofuran,
2-[γ-(4-2,4-dimethoxyphenyl-1,2,5,6-tetrahydropyridino)butyroyl]dibenzofuran,
2-[γ-(4-4-dimethylaminophenyl-1,2,5,6-tetrahydropyridino)butyroyl]dibenzofuran,
2-[γ-(4-4-phenylphenyl-1,2,5,6-tetrahydropyridino)butyroyl]dibenzofuran,
2-[γ-(4-4-methylthiophenyl-1,2,5,6-tetrahydropyridino)butyroyl]dibenzofuran,
2-[γ-(4,2-fluorophenyl-1,2,5,6-tetrahydropyridino)butyroyl]dibenzofuran,
2-[γ-(4-3-benzylphenyl-1,2,5,6-tetrahydropyridino)butyroyl]dibenzofuran,
2-[γ-(4-4-trifluoromethylphenyl-1,2,5,6-tetrahydropyridino)butyroyl]dibenzofuran,
2-[γ-(2-methyl-4-phenyl-1,2,5,6-tetrahydropyridino)butyroyl]dibenzofuran,
2-[γ-(4-4-bromophenyl-1,2,5,6-tetrahydropyridino)butyroyl]dibenzofuran,
2-[γ-(4-4-phenoxyphenyl-1,2,5,6-tetrahydropyridino)butyroyl]dibenzofuran,
2-[γ-(2,6-dimethyl-4-phenyl-1,2,5,6-tetrahydropyridino)butyroyl]dibenzofuran,
2-[γ-(4-hydroxy-1,2,5,6-tetrahydropyridino)butyroyl]dibenzofuran,
2-[γ-(morpholino)butyroyl]dibenzofuran,
2-[γ-(2-hydroxymorpholino)butyroyl]dibenzofuran,
2-[γ-(2,5-dimethylmorpholino)butyroyl]dibenzofuran,
2-[γ-(3-methylmorpholino)butyroyl]dibenzofuran,
2-[γ-(2-hexylmorpholino)butyroyl]dibenzofuran,
2-[γ-(4-methylpiperidino)butyroyl]dibenzofuran,
2-[γ-(2,6-diethylpiperidino)butyroyl]dibenzofuran,
2-[γ-(4-hydroxypiperidino)butyroyl]dibenzofuran,
2-[γ-(4-phenylpiperidino)butyroyl]dibenzofuran,
2-[γ-(4-4-chorophenylpiperidino)butyroyl]dibenzofuran,
2-[γ-(3-butylpiperidino)butyroyl]dibenzofuran,
2-[γ-(4-2-bromophenylpiperidino)butyroyl]dibenzofuran,
2-[γ-(4-phenyl-4-hydroxypiperidino)butyroyl]dibenzofuran,
2-[γ-(4-3-iodophenylpiperidino)butyroyl]dibenzofuran,
2-[γ-(4-4-trifluoromethylphenylpiperidino)butyroyl]dibenzofuran,
2-[γ-(4-2,5-dimethylphenylpiperidino)butyroyl]dibenzofuran,
2-[γ-(4-3-ethoxyphenylpiperidino)butyroyl]dibenzofuran,
2-[γ-(4-3-dmethylaminophenylpiperidino)butyroyl]dibenzofuran,
2-[γ-(4-4-fluorophenylpiperidino)butyroyl]dibenzofuran,
2-[γ-(4-4-phenylphenylpiperidino)butyroyl]dibenzofuran,
2-[γ-(4-4-phenoxyphenylpiperidino)butyroyl]dibenzofuran,
2-[γ-(4-4-benzylphenylpiperidino)butyroyl]dibenzofuran,
2-[γ-(4-4-methylthiophenylpiperidino)butyroyl]dibenzofuran,
2-[γ-(4-,2-methoxyphenylpiperidino)butyroyl]dibenzofuran,
2-[γ-(4-2-propoxyphenylpiperidino)butyroyl]dibenzofuran,
2-[γ-(2,5-dimethyl-4-phenylpiperidino)butyroyl]dibenzofuran,
2-[γ-(3-hydroxy-4-4-trifluoromethylphenylpiperidino)butyroyl]dibenzofuran,
2-[γ-(hexamethyleneimino)butyroyl]dibenzofuran,
2-[γ-(3-methylhexamethyleneimino)butyroyl]dibenzofuran,
2-[γ-(4-hydroxyhexamethyleneimino)butyroyl]dibenzofuran,
2-[γ-(3,6-diethylhexamethyleneimino)butyroyl]dibenzofuran,
2-[γ-(2-hydroxyhexamethyleneimino)butyroyl]dibenzofuran,
2-[γ-(pyrrolidino)butyroyl]dibenzofuran,
2-[γ-(2-methylpyrrolidino)butyroyl]dibenzofuran,
2-[γ-(2-hexylpyrrolidino)butyroyl]dibenzofuran,
2-[γ-(3-hydroxypyrrolidino)butyroyl]dibenzofuran,
2-[γ-(2-hydroxy-3-methylpyrrolidino)butyroyl]dibenzofuran,
2-[γ-(2,4-dimethylpyrrolidino)butyroyl]dibenzofuran,
2-[γ-(4-methylpiperazino)butyroyl]dibenzofuran,
2-[γ-(4-hydroxypiperazino)butyroyl]dibenzofuran,
2-[γ-(4-phenylpiperazino)butyroyl]dibenzofuran,
2-[γ-(4-2-methoxyphenylpiperazino)butyroyl]dibenzofuran,
2-[γ-(2-hydroxypiperazino)butyroyl]dibenzofuran,
2-[γ-(2,6-dimethylpiperazino)butyroyl]dibenzofuran,
2-[γ-(4-4-trifluoromethylphenylpiperazino)butyroyl]dibenzofuran,
2-[γ-(4-2-chlorophenylpiperazino)butyroyl]dibenzofuran,
2-[γ-(4-3-bromophenylpiperazino)butyroyl]dibenzofuran,
2-[γ-(4-2-fluorophenylpiperazino)butyroyl]dibenzofuran,
2-[γ-(4-2-iodophenylpiperazino)butyroyl]dibenzofuran,
2-[γ-(4-4-methylphenylpiperazino)butyroyl]dibenzofuran,
2-[γ-(4-3-methylthiophenylpiperazino)butyroyl]dibenzofuran,
2-[γ-(4-3-phenylphenylpiperazino)butyroyl]dibenzofuran,
2-[γ-(4-3-phenoxyphenylpiperazino)butyroyl]dibenzofuran,
2-[γ-4-2-benzylphenylpiperazino)butyroyl]dibenzofuran,
2-[γ-(4-4-diethylaminophenylpiperazino)butyroyl]dibenzofuran,
2-[γ-(4-4-methoxyphenylpiperazino)butyroyl]dibenzofuran and
2-[γ-(4-3-propoxyphenylpiperazino)butyroyl]dibenzofuran, respectively.

EXAMPLE 7

When, in the procedure of Example 2, 4-phenyl-1,2,5,6-tetrahydropyridine is replaced by an equal molar amount of methylamine,
propylamine,
phenylamine,
benzylamine,
2-aminomethylbenzodioxane,
cyclopropylamine,
N-benzyl-N-cyclopropylamine,
cyclohexylamine,
β-phenylcyclopropylamine,
dimethylamine,
4-methylphenylamine,
heptylamine,
butylamine,
ethylamine,
N-methyl-N-(4-methoxyphenyl)amine,
N-methyl-N-(β-phenylcyclopropyl)amine,
2,6-dichlorophenylamine,
4-dimethylaminobenzylamine,
dibenzylamine,
phenethylamine,
4-trifluoromethylphenylamine,
N-ethyl-N-2,4-diethylphenylamine,
phenylisopropylamine,
2-methoxybenzylamine,
2-bromophenylamine,
3-fluorophenylamine,
2-iodophenylamine,
N-benzyl-N-(4-phenylphenyl)amine,
3-phenoxyphenylamine,
4-benzylphenylamine and
4-ethylthiophenylamine, there are obtained, 2-[γ-(methylamino)butyroyl]dibenzofuran,
2-[γ-(propylamino)butyroyl]dibenzofuran,
2-[γ-(phenylamino)butyroyl]dibenzofuran,
2-[γ-(benzylamino)butyroyl]dibenzofuran,
2-[γ-(2-benzodioxanmethyleneamino)butyroyl]dibenzofuran,
2-[γ-(cyclopropylamino)butyroyl]dibenzofuran,
2-[γ-(N-benzyl-N-cyclopropylamino)butyroyl]dibenzofuran,
2-[γ-(cyclohexylamino)butyroyl]dibenzofuran,
2-[γ-(β-phenylcyclopropylamino)butyroyl]dibenzofuran,
2-[γ-(dimethylamino)butyroyl]dibenzofuran,
2-[γ-(4-methylphenylamino)butyroyl]dibenzofuran,
2-[γ-(heptylamino)butyroyl]dibenzofuran,
2-[γ-(butylamino)butyroyl]dibenzofuran,
2-[γ-(ethylamino)butyroyl]dibenzofuran,
2-(γ-(N-methyl-N-4-methoxyphenylamino)butyroyl]dibenzofuran,
2-[γ-(N-methyl-N-β-phenylcyclopropylamino)butyroyl]dibenzofuran,
2-[γ-(2,6-dichlorophenylamino)butyroyl]dibenzofuran,
2-[γ-(4-dimethylaminobenzylamino)butyroyl]dibenzofuran,
2-[γ-(dibenzylamino)butyroyl]dibenzofuran,
2-[γ-(phenethylamino)butyroyl]dibenzofuran,
2-[γ-(4-trifluoromethylphenylamino)butyroyl]dibenzofuran,
2-[γ-(N-ethyl-N-2,4-diethylphenylamino)butyroyl]dibenzofuran,
2-[γ-(phenylisopropylamino)butyroyl]dibenzofuran,
2-[γ-(2-methoxybenzylamino)butyroyl]dibenzofuran,
2-[γ-(2-bromophenylamino)butyroyl]dibenzofuran,
2-[γ-(3-fluorophenylamino)butyroyl]dibenzofuran,
2-[γ-(2-iodophenylamino)butyroyl]dibenzofuran,
2-[γ-(N-benzyl-N-4-phenylphenylamino)butyroyl]dibenzofuran,
2-[γ-(3-phenoxyphenylamino)butyroyl]dibenzofuran,
2-[γ-(4-benzylphenylamino)butyroyl]dibenzofuran, and
2-[γ-(4-ethylthiophenylamino)butyroyl]dibenzofuran, respectively.

EXAMPLE 8

When, in the procedure of Example 1, 4-chlorobutyroyl chloride is replaced by an equal molar amount of 2-chloroacetyl chloride,
3-chloropropionyl chloride,
2-chlorobutyroyl chloride,
3-bromobutyroyl chloride,
2-chloropropionyl chloride,
6-chlorohexanoyl chloride and
8-chlorooctanoyl chloride, there are obtained, 2-(2-chloroacetyl)dibenzofuran,
2-(3-chloropropionyl)dibenzofuran,
2-(2-chlorobutyroyl)dibenzofuran,
2-(3-bromobutyroyl)dibenzofuran,
2-(2-chloropropionyl)dibenzofuran,
2-(6-chlorohexanoyl)dibenzofuran and
2-(8-chlorooctanoyl)dibenzofuran, respectively.

EXAMPLE 9

When, in the procedure of Example 2, 2-(4-chlorobutyroyl)dibenzofuran is replaced by an equal molar amount of each of the products of Example 8, there are obtained, 2-[α-(4-phenyl-1,2,5,6-tetrahydropyridino)acetyl]dibenzofuran,
2-[β-(4-phenyl-1,2,5,6-tetrahydropyridino)propionyl]dibenzofuran,
2-[α(4-phenyl-1,2,5,6-tetrahydropyridino)butyroyl]dibenzofuran,
2-[β-(4-phenyl-1,2,5,6-tetrahydropyridino)butyroyl]dibenzofuran,
2-[α-(4-phenyl-1,2,5,6-tetrahydropyridino)propionyl]dibenzofuran,
2-[ε-(4-phenyl-1,2,5,6-tetrahydropyridino)hexanoyl]dibenzofuran, and
2-[η-(4-phenyl-1,2,5,6-tetrahydropyridino)octanoyl]dibenzofuran, respectively.

EXAMPLE 10

When, in the procedure of Example 3, 2-[γ-(4-phenyl-1,2,5,6 - tetrahydropyridino)butyroyl]dibenzofuran is replaced by an equal molar amount of each of the products of Example 6, there are obtained, 1-(2-dibenzofuryl)-4-(1,2,5,6-tetrahydropyridino)butanol,
1-(2-dibenzofuryl)-4-(2-hydroxy-1,2,5,6-tetrahydropyridino)butanol,
1-(2-dibenzofuryl)-4-(4-methyl-1,2,5,6-tetrahydropyridino)butanol,
1-(2-dibenzofuryl)-4-(5-methyl-1,2,5,6-tetrahydropyridino)butanol,
1-(2-dibenzofuryl)-4-(2,5-dimethyl-1,2,5,6-tetrahydropyridino)butanol,
1-(2-dibenzofuryl)-4-(5-octyl-1,2,5,6-tetrahydropyridino)butanol,
1-(2-dibenzofuryl)-4-(6-propyl-1,2,5,6-tetrahydropyridino)butanol,
1-(2-dibenzofuryl)-4-(2-hydroxy-5-methyl-1,2,5,6-tetrahydropyridino)butanol,
1-(2-dibenzofuryl)-4-(3-methyl-1,2,5,6-tetrahydropyridino)butanol,
1-(2-dibenzofuryl)-4-(4-4-methoxyphenyl-1,2,5,6-tetrahydropyridino)butanol,
1-(2-dibenzofuryl)-4-(4-3-chlorophenyl-1,2,5,6-tetrahydropyridino)butanol,
1-(2-dibenzofuryl)-4-(4-2-iodophenyl-1,2,5,6-tetrahydropyridino)butanol, 1-(2-dibenzofuryl)-4-(4-4-methylphenyl-1,2,5,6-tetrahydropyridino)butanol,
1-(2-dibenzofuryl)-4-(4-2,4-dimethoxyphenyl-1,2,5,6-tetrahydropyridino)butanol,
1-(2-dibenzofuryl)-4-(4-4-dimethylaminophenyl-1,2,5,6-tetrahydropyridino)butanol,
1-(2-dibenzofuryl)-4-(4-4-phenylphenyl-1,2,5,6-tetrahydropyridino)butanol,
1-(2-dibenzofuryl)-4-(4-4-methylthiophenyl-1,2,5,6-tetrahydropyridino)butanol,
1-(2-dibenzofuryl)-4-(4-2-fluorophenyl-1,2,5,6-tetrahydropyridino)butanol,
1-(2-dibenzofuryl)-4-(4-3-benzylphenyl-1,2,5,6-tetrahydropyridino)butanol,
1-(2-dibenzofuryl)-4-(4-4-trifluoromethylphenyl-1,2,5,6-tetrahydropyridino)butanol,
1-(2-dibenzofuryl)-4-(2-methyl-4-phenyl-1,2,5,6-tetrahydropyridino)butanol,
1-(2-dibenzofuryl)-4-(4-4-bromophenyl-1,2,5,6-tetrahydropyridino)butanol,
1-(2-dibenzofuryl)-4-(4-4-phenoxyphenyl-1,2,5,6-tetrahydropyridino)butanol,
1-(2-dibenzofuryl)-4-(2,6-dimethyl-4-phenyl-1,2,5,6-tetrahydropyridino)butanol,
1-(2-dibenzofuryl)-4-(4-hydroxy-1,2,5,6-tetrahydropyridino)butanol,
1-(2-dibenzofuryl)-4-(morpholino)butanol,
1-(2-dibenzofuryl)-4-(2-hydroxymorpholino)butanol,
1-(2-dibenzofuryl)-4-(2,5-dimethylmorpholino)butanol,
1-(2-dibenzofuryl)-4-(3-methylmorpholino)butanol,
1-(2-dibenzofuryl)-4-(2-hexylmorpholino)butanol,
1-(2-dibenzofuryl)-4-(4-methylpiperidino)butanol,
1-(2-dibenzofuryl)-4-(2,6-diethylpiperidino)butanol,
1-(2-dibenzofuryl)-4-(4-hydroxypiperidino)butanol,
1-(2-dibenzofuryl)-4-(4-phenylpiperidino)butanol,
1-(2-dibenzofuryl)-4-(4-4-chlorophenylpiperidino)butanol,
1-(2-dibenzofuryl)-4-(3-butylpiperidino)butanol,
1-(2-dibenzofuryl)-4-(4-2-bromophenylpiperidino)butanol,
1-(2-dibenzofuryl)-4-(4-phenyl-4-hydroxypiperidino)butanol,
1-(2-dibenzofuryl)-4-(4-3-iodophenylpiperidino)butanol,
1-(2-dibenzofuryl)-4-(4-4-trifluoromethylphenylpiperidino)butanol,
1-(2-dibenzofuryl)-4-(4-2,5-dimethylphenylpiperidino)butanol,
1-(2-dibenzofuryl)-4-(4-3-ethoxyphenylpiperidino)butanol,
1-(2-dibenzofuryl)-4-(4-3-dimethylaminophenylpiperidino)butanol,
1-(2-dibenzofuryl)-4-(4-4-fluorophenylpiperidino)butanol,
1-(2-dibenzofuryl)-4-(4-4-phenylphenylpiperidino)butanol,
1-(2-dibenzofuryl)-4-(4-4-phenoxyphenylpiperidino)butanol,
1-(2-dibenzofuryl)-4-(4-4-benzylphenylpiperidino)butanol,
1-(2-dibenzofuryl)-4-(4-4-methylthiophenylpiperidino)butanol,
1-(2-dibenzofuryl)-4-(4-2-methoxyphenylpiperidino)butanol,
1-(2-dibenzofuryl)-4-(4-2-propoxyphenylpiperidino)butanol,
1-(2-dibenzofuryl)-4-(2,5-dimethyl-4-phenylpiperidino)butanol,
1-(2-dibenzofuryl)-4-(3-hydroxy-4-4-trifluoromethylphenylpiperidino)butanol,
1-(2-dibenzofuryl)-4-(hexamethyleneimino)butanol,
1-(2-dibenzofuryl)-4-(3-methylhexamethyleneimino)butanol,
1-(2-dibenzofuryl)-4-(4-hydroxyhexamethyleneimino)butanol,
1-(2-dibenzofuryl)-4-(3,6-diethylhexamethyleneimino)butanol,
1-(2-dibenzofuryl)-4-(2-hydroxyhexamethyleneimino)butanol,
1-(2-dibenzofuryl)-4-(pyrrolidino)butanol,
1-(2-dibenzofuryl)-4-(2-methylpyrrolidino)butanol,
1-(2-dibenzofuryl)-4-(2-hexylpyrrolidino)butanol,
1-(2-dibenzofuryl)-4-(3-hydroxypyrrolidino)butanol,
1-(2-dibenzofuryl)-4-(2-hydroxy-3-methylpyrrolidino)butanol,
1-(2-dibenzofuryl)-4-(2,4-dimethylpyrrolidino)butanol,
1-(2-dibenzofuryl)-4-(4-methylpiperazino)butanol,
1-(2-dibenzofuryl)-4-(4-hydroxypiperazino)butanol,
1-(2-dibenzofuryl)-4-(4-phenylpiperazino)butanol,
1-(2-dibenzofuryl)-4-(4-2-methoxyphenylpiperazino)butanol,
1-(2-dibenzofuryl)-4-(2-hydroxypiperazino)butanol,
1-(2-dibenzofuryl)-4-(2,6-dimethylpiperazino)butanol,
1-(2-dibenzofuryl)-4-(4-4-trifluoromethylphenylpiperazino)butanol,
1-(2-dibenzofuryl)-4-(4-2-chlorophenylpiperazino)butanol,
1-(2-dibenzofuryl)-4-(4-3-bromophenylpiperazino)butanol,
1-(2-dibenzofuryl)-4-(4-2-fluorophenylpiperazino)butanol,
1-(2-dibenzofuryl)-4-(4-2-iodophenylpiperazino)butanol,
1-(2-dibenzofuryl)-4-(4-4-methylphenylpiperazino)butanol,
1-(2-dibenzofuryl)-4-(4-3-methylthiophenylpiperazino)butanol,
1-(2-dibenzofuryl)-4-(4-3-phenylphenylpiperazino)butanol,
1-(2-dibenzofuryl)-4-(4-3-phenoxyphenylpiperazino)butanol,
1-(2-dibenzofuryl)-4-(4-2-benzylphenylpiperazino)butanol,
1-(2-dibenzofuryl)-4-(4-4-diethylaminophenylpiperazino)butanol,
1-(2-dibenzofuryl)-4-(4-4-methoxyphenylpiperazino)butanol and
1-(2-dibenzofuryl)-4-(4-3-propoxyphenylpiperazino)butanol, respectively.

EXAMPLE 11

When, in the procedure of Example 3, 2-[γ-(4-phenyl-1,2,5,6-tetrahydropyridino)butyroyl]dibenzofuran is replaced by an equal molar amount of each of the products of Example 7, there are obtained, 1-(2-dibenzofuryl)-4-(methylamino)butanol,
1-(2-dibenzofuryl)-4-(propylamino)butanol,
1-(2-dibenzofuryl)-4-(phenylamino)butanol,
1-(2-dibenzofuryl)-4-(benzylamino)butanol,
1-(2-dibenzofuryl)-4-(2-benzodioxanmethyleneamino)butanol,
1-(2-dibenzofuryl)-4-(cyclopropylamino)butanol,
1-(2-dibenzofuryl)-4-(N-benzyl-N-cyclopropylamino)butanol,
1-(2-dibenzofuryl)-4-(cyclohexylamino)butanol,
1-(2-dibenzofuryl)-4-(β-phenylcyclopropylamino)butanol,
1-(2-dibenzofuryl)-4-(dimethylamino)butanol,
1-(2-dibenzofuryl)-4-(4-methylphenylamino)butanol,
1-(2-dibenzofuryl)-4-(heptylamino)butanol,
1-(2-dibenzofuryl)-4-(butylamino)butanol,
1-(2-dibenzofuryl)-4-(ethylamino)butanol,
1-(2-dibenzofuryl)-4-[N-methyl-N-(4-methoxyphenyl)amino]butanol,
1-(2-dibenzofuryl)-4-[N-methyl-N-(β-phenylcyclopropyl)amino]butanol,
1-(2-dibenzofuryl)-4-(2,6-dichlorophenylamino)butanol,
1-(2-dibenzofuryl)-4-(4-dimethylaminobenzylamino)butanol, 1-(2-dibenzofuryl)-4-(dibenzylamino)butanol,
1-(2-dibenzofuryl)-4-(phenethylamino)butanol,
1-(2-dibenzofuryl)-4-(4-trifluoromethylphenylamino)butanol,
1-(2-dibenzofuryl)-4-(N-ethyl-N-2,4-diethylphenylamino)butanol,
1-(2-dibenzofuryl)-4-(phenylisopropylamino)butanol,
1-(2-dibenzofuryl)-4-(2-methoxybenzylamino)butanol,
1-(2-dibenzofuryl)-4-(2-bromophenylamino)butanol,
1-(2-dibenzofuryl)-4-(3-fluorophenylamino)butanol,
1-(2-dibenzofuryl)-4-(2-iodophenylamino)butanol,
1-(2-dibenzofuryl)-4-[N-benzyl-N-(4-phenylphenyl)amino]butanol,
1-(2-dibenzofuryl)-4-(3-phenoxyphenylamino)butanol,
1-(2-dibenzofuryl)-4-(4-benzylphenylamino)butanol, and
1-(2-dibenzofuryl)-4-(4-ethylthiophenylamino)butanol, respectively.

EXAMPLE 12

When, in the procedure of Example 3, 2-[γ-(4-phenyl-1,2,5,6 - tetrahydropyridino)butyroyl]dibenzofuran is replaced by an equal molar amount of each of the products of Example 9, there are obtained, 1-(2-dibenzofuryl)-2-(4-phenyl-1,2,5,6-tetrahydropyridino)ethanol,
1-(2-dibenzofuryl)-3-(4-phenyl-1,2,5,6-tetrahydropyridino)propanol,
1-(2-dibenzofuryl)-2-(4-phenyl-1,2,5,6-tetrahydropyridino)butanol,
1-(2-dibenzofuryl)-3-(4-phenyl-1,2,5,6-tetrahydropyridino)butanol,
1-(2-dibenzofuryl)-2-(4-phenyl-1,2,5,6-tetrahydropyridino)propanol,
1-(2-dibenzofuryl)-6-(4-phenyl-1,2,5,6-tetrahydropyridino)hexanol, and
1-(2-dibenzofuryl)-8-(4-phenyl-1,2,5,6-tetrahydropyridino)octanol, respectively.

EXAMPLE 13

Preparation of 2-[4-(o-methoxyphenylpiperazino)butyroyl]dibenzofuran

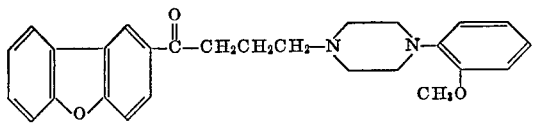

A mixture of 2-(γ-chlorobutyroyl)-dibenzofuran (9.55 0.035 mole), o - methoxyphenylpiperazine (6.73 g., 0.035 mole), sodium carbonate (7.42 g., 0.07 mole), sodium iodide (0.3 g.) and methyl isobutyl ketone (150 ml.) was heated at reflux with stirring for about 65 hours. The reaction mixture was filtered and the filtrate concentrated to give 15 g. of an oil which solidified. The solid was recrystallized from ethanol twice to give a solid, 2 - [4 - (o-methoxyphenylpiperazino)butyroyl]-dibenzofuran, M.P. 140–142.5° C., yield, 5.16 g. An analytical sample gave M.P. 143–144° C.

Analysis.—Calcd. for $C_{27}H_{28}N_2O_3$ (percent): C, 75.67; H, 6.59; N, 6.54. Found (percent): C, 75.60; H, 6.57; N, 6.34.

While this invention has been described and exemplified in terms of its preferred embodiment, those skilled in the art will appreciate that modifications can be made without departing from the spirit and scope of this invention.

EXAMPLE 14

Preparation of 2-[β-(N'-o-methoxyphenyl)piperazino]propionyldibenzofuran

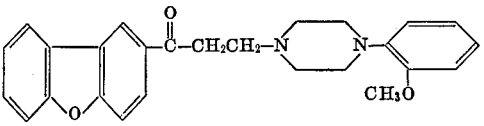

By the procedure of Example 1 dibenzofuran was reacted with 3-chloropropionyl chloride to produce 2-(3-chloropropionyl)dibenzofuran, which in turn was reacted according to Example 2 with N-(o-methoxyphenyl)piperazine to produce 2-[β-(N'-o-methoxyphenyl)piperazino]propionyldibenzofuran. The product was obtained as a white solid which was collected by filtration melting at 147.5–148.5° C. An infrared spectrum showed peaks at 6.0 and 8.06μ. The sample purified for analysis melted at 149–149.5° C.

Analysis.—Calcd. for $C_{26}H_{26}O_3N_2$ (percent): C, 75.34; H, 6.32; N, 6.76. Found (percent): C, 75.27; H, 6.14; N, 6.82.

EXAMPLE 15

Alternate procedure for preparation of 2-[β-(N'-o-methoxyphenyl)piperazino]propionyldibenzofuran (A) 2 - acetyldibenzofuran: This compound was obtained by a standard Friedel-Crafts reaction as described under Example 1 by reacting dibenzofuran with acetyl chloride and aluminum chloride. The product which distilled at 135–145° C./0.08 mm. weighed 133 g. (63% yield). The solid gave M.P. 67–69° C. (lit. 80–81° C.) but one recrystallization from methanol gave M.P. 74–75.5° C. with no loss. References: N.P. Buü-Hoy and R. Royer, Rec. trav. chim. 69, 861 (1950); C.A. 45, 3832 (1951); Galewsky Ann., 264, 189; Beilstein 17, 363 (1933).

(B) β-Dimethylamino - 2 - propionyl-dibenzofuran hydrochloride: A mixture of 2-acetyl-dibenzofuran (21.0 g., 0.1 M), dimethylamine hydrochloride (8.2 g., 0.1 M), paraformaldehyde (3.0 g., 0.1 M) and acetic acid (30 ml.) was heated on the steam bath for 1.5 hours, then concentrated. The residue was triturated with acetone (50 ml.) to give a white solid. The product was recrystallized from ethanol; when dry, it weighed 16.0 g. (53% yield); M.P. 195–196° C. An infrared spectrum showed a strong peak at 5.98μ. A sample was converted to the base to give a solid which after recrystallization from isopropanol melted at 85–86° C.

Analysis.—Calcd. for $C_{17}H_{17}O_2N$ (percent): C, 76.38; H, 6.41; N, 5.24. Found (percent): C, 76.13; H, 6.25; N, 5.54.

(C) β-Dimethylamino-2-propionyl-dibenzofuran methiodide: β-Dimethylamino-2-propionyl-dibenzofuran hydrochloride (12.5 g., 0.0411 M) was placed in dilute sodium carbonate solution and extracted with ether. The ether extract was dried over anhydrous potassium carbonate. The dry ethereal extract was added dropwise under anhydrous conditions to a solution of methyliodide (13.96 g., 0.098 M) in ether (50 ml.) over a period of 45 minutes. The mixture was stirred at room temperature for 64 hours. Then the white solid was collected; when dry, it weighed 14.6 g. (87% yield), M.P. 200–202° C.

(D) 2 - [β-(N'-o-methoxyphenyl)piperazino]propionyl-dibenzofuran: A mixture of the quaternary salt, β-dimethylamino - 2 - propionyl-dibenzofuran methiodide (7.0 g., 0.0171 M), N-(o-methoxyphenyl)piperazine (3.28 g., 0.0171 M), anhydrous sodium carbonate (3.62 g., 0.0342 M) and dimethylformamide (40 ml.) was stirred by means of a vibromixer. The stirred system was swept with nitrogen for 7.5 hours. The mixture was then poured in cold water (300 ml.). A white solid separated; it was collected by filtration, washed with water and recrystallized from ethanol to give 4.40 g. (62% yield), M.P. 147.5–148.5°

C. An infrared spectrum showed peaks at 6.0 and 8.06. A sample purified for analysis melted at 149–149.5° C.

*Analysis.*—Calcd. for $C_{26}H_{26}O_3N_2$ (percent): C, 75.34; H, 6.32; N, 6.76. Found (percent): C, 75.27; H, 6.14; N, 6.82.

EXAMPLE 16

When in the procedure of Example 15, N-(o-methoxyphenyl)piperazine is replaced by 0.0171 mole of N-(o-ethoxyphenyl)piperazine
N-(o-propoxyphenyl)piperazine
N-(o-isopropoxyphenyl)piperazine
N-(o-butoxyphenyl)piperazine and
N-(o-t-butoxyphenyl)piperazine there are obtained 2-[β-(N'-o-ethoxyphenyl)piperazino]propionyldibenzofuran
2-[β-(N'-o-propoxyphenyl)piperazino]propionyldibenzofuran
2-[β-(N'-o-isopropoxyphenyl)piperazino]propionyldibenzofuran
2-[β-(N'-o-butoxyphenyl)piperazino]propionyldibenzofuran and
2-[β-(N'-o-t-butoxyphenyl)piperazino]propionyldibenzofuran respectively.

While this invention has been described and exemplified in terms of its preferred embodiment, those skilled in the art will appreciate that modifications can be made without departing from the spirit and scope of this invention.

We claim:

1. A compound selected from the group consisting of compounds of the formula

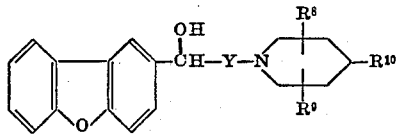

wherein:

$R^8$ and $R^9$ each represent hydrogen, (lower)alkyl or hydroxy, $R^{10}$ represents hydrogen, (lower)alkyl, hydroxy or a radical of the formula

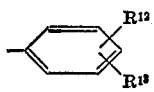

$R^{12}$ and $R^{13}$ each represent a member selected from the group consisting of hydrogen, (lower)alkyl, (lower)- alkoxy, chloro, bromo, fluoro, iodo, trifluoromethyl, di-(lower)alkylamino, (lower)alkylthio, phenyl, phenoxy and benzyl, and Y is (lower)alkylene; and the pharmaceutically acceptable nontoxic salts thereof.

2. A compound of claim 1 having the formula

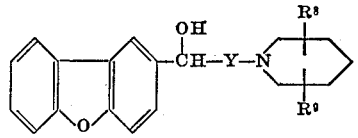

wherein:

$R^8$ and $R^9$ each represent hydrogen, (lower)alkyl or hydroxy and

Y is (lower)alkylene.

3. The compound of claim 1 having the formula

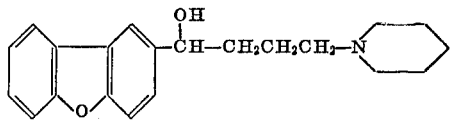

4. The pharmaceutically acceptable nontoxic salts of the compound of claim 3.

5. The compound of claim 1 having the formula

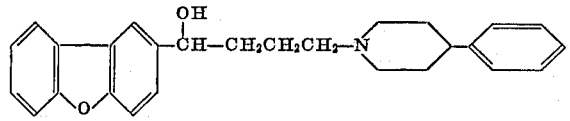

6. The compound of claim 1 having the formula

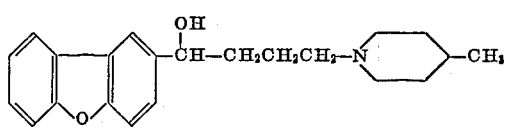

References Cited

FOREIGN PATENTS 687,892   2/1953   Great Britain _____ 260—346.2
703,257   2/1954   Great Britain _____ 260—346.2

HENRY R. JILES, Primary Examiner

G. T. TODD, Assistant Examiner

U.S. Cl. X.R.

260—247.7G, 268 TR, 297 T, 326.5 CA, 340.3, 346.2 M; 424—248, 250, 263, 267, 274, 285